(No Model.)

M. V. YERKES.
HORSE BOOT.

No. 434,619. Patented Aug. 19, 1890.

WITNESSES:
Louis Boss
P. H. Coggins

INVENTOR
Martin V. Yerkes
BY
Edward P. Bliss,
ATTORNEY.

UNITED STATES PATENT OFFICE.

MARTIN V. YERKES, OF BERWYN, PENNSYLVANIA.

HORSE-BOOT.

SPECIFICATION forming part of Letters Patent No. 434,619, dated August 19, 1890.

Application filed May 13, 1890. Serial No. 351,640. (No model.)

*To all whom it may concern:*

Be it known that I, MARTIN V. YERKES, of Berwyn, in the county of Chester and State of Pennsylvania, have invented certain new and useful Improvements in Horse-Boots; and I do hereby declare the following to be a full, clear, and exact description of my invention, such as will enable others skilled in the art to which it appertains to make and use the same.

My invention relates to that class of horse-boots adapted and intended for use in cases where either by reason of interfering or other causes the fetlock or other joint of the animal has been cut or bruised, and it is necessary to protect the joint from further injury in order that the wound may heal. Heretofore it has been sought to accomplish this purpose either by close pads covering the whole joint and having a cavity or recess over the wounded portion, or by similar pads having one or more openings or apertures in them. The objections to all devices of this nature heretofore in use are, first, that a special pad or boot must in most instances be manufactured to suit each case; second, that such boots or pads are liable to be moved out of position and caused to chafe the injured parts, and, third, that particles of dirt, gravel, &c., accumulate between the boot and the horse's leg, and by constant rubbing not only rapidly wear out the boot, but also irritate the wound and prevent it from healing. All of these defects are obviated by my invention, which is illustrated by the accompanying drawings, of which—

Figure 1:
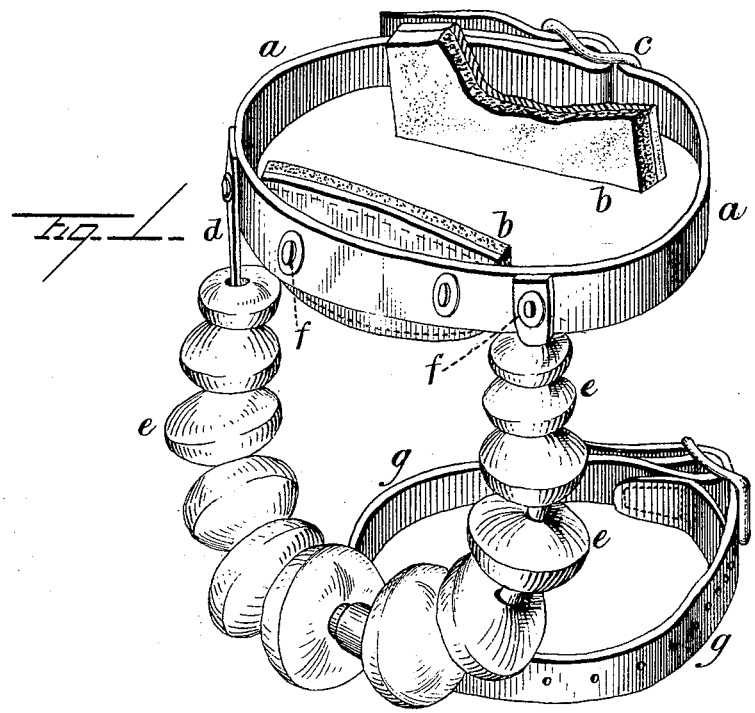
Figure 2:
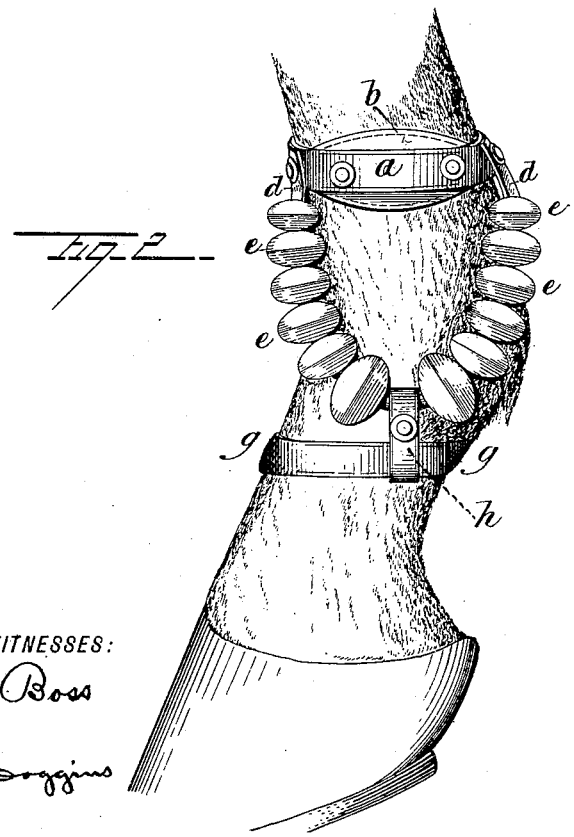

Figure 1 is a general perspective view of my device, and Fig. 2 shows the same as applied to the fetlock or pastern joint of a horse.

Like parts are designated by the same letters in both figures.

$a$ is a leg-strap, which may preferably be provided with pads $b\ b$, adapted to conform to the inequalities of the horse's leg, and thereby assist in maintaining the leg-strap in its proper position.

$c$ is a buckle, by means of which the leg-strap may be tightened and secured.

$d$ is a curved strip of leather, rawhide, or other suitable material, upon which are loosely strung the spheroidal or spherical balls $e\ e\ e$, preferably formed of rubber, although wood, bone, or other suitable material may be used, if desired. The two ends of the strip $d$ are secured to the leg-strap $a$ by means of rivets $f\ f$, and the lower portion of the loop thus formed is attached to another leg-strap $g$, adapted to pass around the horse's leg and be secured below the joint requiring protection. The mode of attachment may be either directly to the leg-strap or preferably by means of an intermediate loop $h$, as shown in Fig. 2.

The method of operation of the device described will readily be perceived. The balls $e\ e\ e$, projecting as they do above the surface of the wounded joint, serve to protect the latter from further injury, and by reason of their shape, their elasticity, and the freedom with which they revolve upon the strip $d$ greatly diminish the shock of any blow. In addition to these advantages, the shape and mobility of the balls effectually prevent the accumulation of dirt or foreign matter.

Having thus fully described the construction and mode of operation of my invention, what I claim, and desire to secure by Letters Patent, is—

In a boot for horses, the guard, formed of balls loosely strung upon a curved or looped strip of leather, rawhide, or other suitable material, secured to an upper and a lower leg-strap, and fastening means therefor, substantially as shown and described.

In testimony whereof I have signed this specification in the presence of two subscribing witnesses.

MARTIN V. YERKES.

Witnesses:
GEO. W. HUNT,
THOS. J. HUNT.